United States Patent
Renaud

[11] 4,261,625
[45] Apr. 14, 1981

[54] RELEASE BEARING HAVING RIGID BEARING BOSSES DEFLECTING DIRT OR GRIME

[75] Inventor: Piérre J. Renaud, Le Plessis-Trevise, France

[73] Assignee: Societe Anonyme Francaise du Ferodo, Paris, France

[21] Appl. No.: 973,724

[22] Filed: Dec. 27, 1978

[30] Foreign Application Priority Data

Jan. 4, 1978 [FR] France .................. 78 00177

[51] Int. Cl.³ .................. F16C 33/30; F16D 23/14
[52] U.S. Cl. .................. 308/4 R; 192/98; 308/237 A
[58] Field of Search .................. 308/4 R, 237 A, 238, 308/239; 192/110 B, 98

[56] References Cited

U.S. PATENT DOCUMENTS

| | | | |
|---|---|---|---|
| 3,186,312 | 6/1965 | Hott et al. .................. | 308/4 R |
| 4,117,916 | 10/1978 | Baker .................. | 192/98 |
| 4,142,618 | 3/1979 | Fontaine et al. .................. | 192/98 |

*Primary Examiner*—Steven L. Stephan
*Attorney, Agent, or Firm*—Charles E. Brown

[57] ABSTRACT

A release bearing having an axial bore is received for sliding movement on a guide member thereon. The bore is provided with substantially rigid bearing bosses disposed at the axial extremities of generatrices of the bore and having inclined leading edges. In operation they deflect the dirt or grime that may be present on the guide member into passages circumferentially between bearing bosses and then on to a cavity or recess in the bore. Preferably the pairs of bearing bosses are interconnected by axial ribs. The axial ribs in turn delimit grooves which make up the dirt and grime collecting recess or cavity. Alternatively, intermediate bosses may be provided between pairs of bearing bosses. The bearing surface of the ribs may be part cylindrical or define line or point contact.

9 Claims, 7 Drawing Figures

RELEASE BEARING HAVING RIGID BEARING BOSSES DEFLECTING DIRT OR GRIME

The present invention relates to clutch release bearings also known as throw-out bearings which are cooperable with the clutch release mechanism of a frictional clutch for effecting declutching and clutching.

The invention relates more particularly to such clutch release bearings which have an axial bore for sliding engagement on a fixed guide member substantially coaxial therewith, taking tolerances into account. Most frequently the guide member is a tubular sleeve or so-called "trompet" member carried by the case of the gear box and surrounding the input shaft therefor.

Such a fixed guide member is inevitably subjected to the penetration of dirt and/or grime and other foreign bodies which gradually accumulate and may come to interfere with the sliding of the release bearing in the course of operation and may even cause the release bearing to jam.

To overcome this drawback it has already been proposed, in French Pat. No. 72 24778 granted on Jan. 29, 1973, to equip the ends of the axial bore of the release bearing with bearing members, namely resilient split rings which protrude radially inwardly, the release bearing being supported by these split rings on the fixed guide. The rings are thus in effect scraper rings which axially define between each other a relatively sealed off cavity and check the penetration of foreign bodies into the cavity.

Such an arrangement is relatively expensive, by reason of the rather delicate mounting of the scraper rings and, moreover, does not always provide satisfactory results. Because of the wedge-shaped cross-section of the scraper rings they may cause the dirt or grime to be stuffed into the cavity which would preclude satisfactory operation of the release bearing.

In another arrangement which was disclosed in French Pat. No. 72 46293 granted on July 8, 1974, the ends of the bore of the release bearing are also equipped with radially elastically deformable bearing members by which the release bearing is supported on its axial guide member.

Yet these bearing members which define circumferentially between each other passages through which the cavity it delimits axially communicates with the surroundings, are not specially adapted to overcome the consequences of the presence of possible dirt or grime other than by scraping the same. Furthermore these bearing members are not even provided with this in mind: they are merely tongues which, owing to their elastic deformation, confer a certain universal type motion on the release bearing with respect to the guide member, to absorb any relative angular displacement capable of generating audible vibrations which may develop between the guide member for the release bearing and the shaft for the clutch being controlled.

An object according to the present invention is to provide a release bearing with bearing members adapted to efficaciously minimize, or even perhaps eliminate, the effect of the presence of dirt or grime on the guide member.

According to the invention there is provided a release bearing having an axial bore provided with inwardly protruding bearing members by which the release bearing may be supported radially on the guide member, which bearing members define passages circumferentially between each other. The invention is characterized by the bearing members comprising substantially rigid bearing bosses the leading or axially outwardly projecting edges of which are at least in part generally inclined with respect to the axis of the release bearing for channeling dirt or grime which may be present on the guide member towards the passages.

Hence, according to the invention, contrary to the arrangement disclosed in French Pat. No. 72 24778 referred to above, the penetration of dirt and grime into the bore of the release bearing is permitted, but arrangements are provided so that such dirt or grime does not interfere with the sliding of the release bearing along the guide member.

In fact the rigid bearing bosses by which the release bearing is supported on the guide member act as deflectors to laterally deflect such dirt or grime, during the sliding of the release bearing so that dirt or grime does not penetrate under the bearing bosses but is deflected or channeled by them to a recess or cavity adapted to collect the same.

In addition such rigid bearing bosses are integrally formed with the wall defining the bore and therefore do not require assembly or other additional parts thereon; advantageously they may be in one piece with the wall in which the bore is defined, for instance, by molding synthetic plastic material.

In practice such bearing bosses are arranged in pairs, bearing bosses of a given pair forming the axial extremeties of an axial supporting rib comprising a continuous or uninterrupted interconnection with the bearing bosses and in one piece therewith. The recess or cavity which is adapted to collect whatever grime or dirt which may have settled is formed by grooves-circumferentially defined between pairs of such ribs.

In any event by their mere rigidity the bearing bosses of the release bearing according to the invention ensures a predetermined positioning of the release bearing on the guide member and thereby distinguishes over the bearing members such as disclosed in the above mentioned French Pat. No. 72 24778 as well as those provided on the throw-out bearing disclosed in the other above mentioned French Pat. No. 72 46293.

The features and advantages of the invention will be brought out in the description which follows, given by way of example, with reference to the accompanying schematic drawings, in which.

Figure 1:
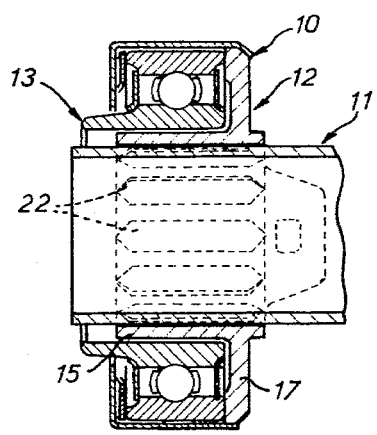
FIG. 1 is a longitudinal cross-sectional view of a clutch release bearing embodying the invention and the guide member on which it is mounted.

In FIG. 1 is recognizable, denoted by general reference numeral 10, a clutch release bearing embodying the present invention and, denoted by general reference numeral 11, a fixed guide member on which the clutch release bearing or throw-out bearing 10 is adapted to be mounted for axial sliding movement.

Such a clutch release bearing 10 is for the most part well known and therefore need not be described in great detail here; it will suffice to point out that it comprises an operating member 12 which is itself mounted for sliding movement on the guide member 11. The operating member 12 is adapted to be attached to a clutch control member which is, in practice, a forked control member for controlling its displacement along the guide member 11. The clutch release bearing 10 also comprises an actuating member 13 which is adapted to cooperate with a clutch release mechanism, not shown, in response to the operation of the clutch control member.

Figure 2:
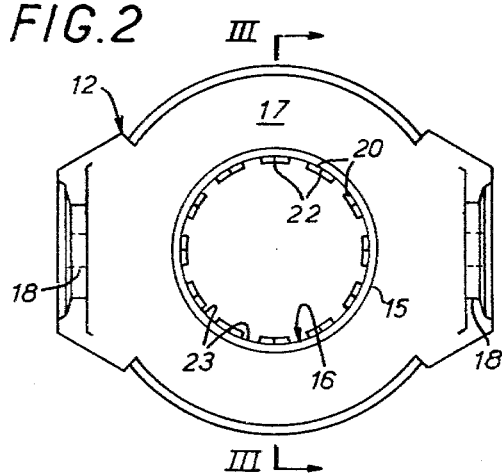
FIG. 2 is an end view of a part of the clutch release bearing, namely the operating member, which is adapted to slidably engage the guide member.
Figure 3:
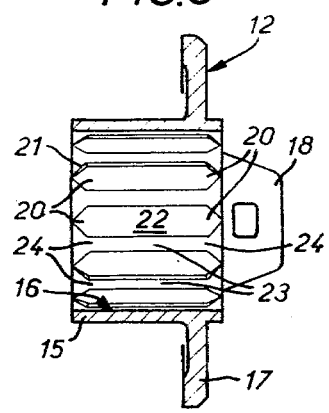
FIG. 3 is longitudinal cross-sectional view taken on the line III—III in FIG. 2.

The operating member 12 which is illustrated alone in FIGS. 2 and 3 and which is, for example, made of a synthetic or plastic material is generally formed as a sleeve 15 having an axial bore 16 to be received or mounted on the guide member 11 and a flange 17 which is adapted to bear the actuating member 13. The flange 17 is also equipped with lugs 18 at diametrically opposed positions for attaching the control member by which it is controlled.

As is known per se, the bore 16 of the operating member 12 is provided with inwardly bearing members by which the operating member 12 and therefore the release bearing 10 of which it is a part may bear radially against the guide member 11, and the inwardly protruding bearing members circumferentially define passages between one another. According to the invention the bearing members comprise substantially rigid bearing bosses 20; the leading edges 21 that is, the edges directed axially outwardly of the bearing bosses 20 are at least in part generally inclined in relation to the axis of the release bearing.

In the illustrated embodiment of FIGS. 2 and 3 the substantially rigid bearing bosses 20 are arranged in pairs, the substantially rigid bearing bosses 20 of a given pair forming the axial extremities of a single axial supporting rib 22 continuously or uninterruptedly interconnecting, in one piece, the bearing bosses.

The axial supporting ribs 22 circumferentially define, in pairs, grooves 23 which together form a recess or cavity communicating with the surroundings through passages 24 which the bearing bosses define between one another at the axial extremities of the grooves 23.

In the illustrated embodiment of FIGS. 2 and 3 the grooves 23 have a rectangular cross-section, their bases being entirely formed by the actual wall of the bore 16.

Finally in the embodiment of FIGS. 2 and 3, the leading edge of each bearing boss 20 is generally V-shaped and points outwardly. The bearing ribs 22 and the bosses 20 which define the axial extremities thereof are formed in one piece with the wall forming the bore 16 through the operating member 12.

In the course of axial sliding movement of the release bearing 10 along the guide member 11, the leading edges of the rigid bearing bosses 20 laterally deflect grime or dirt which may possibly be present on the guide member 11, continually channeling or deflecting it towards the passages 24 and therefore towards the grooves 23 where it is collected without in any manner interfering with the sliding movement of the release bearing.

Figure 4:
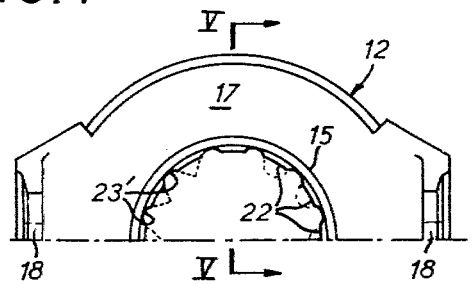
FIGS. 4 and 5 are half views corresponding to FIGS. 2 and 3 for an alternative embodiment.
Figure 5:
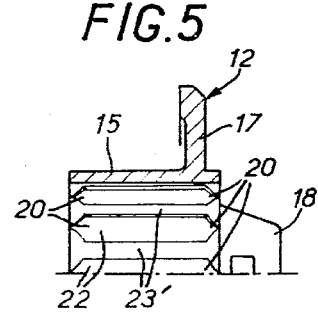

According to the alternative embodiment illustrated in FIGS. 4 and 5, the grooves 23' are of semicircular cross-section.

In the preceding embodiments the substantially rigid bearing bosses 20 disposed at the axial extremities of the bore 16 are uninterruptedly interconnected by ribs 22 between one another.

Figure 6:
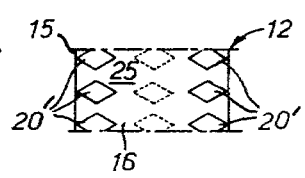
FIG. 6 is a fragmentary view of an array of bearing bosses according to a modified embodiment as viewed in FIGS. 3 and 5.
Figure 7:
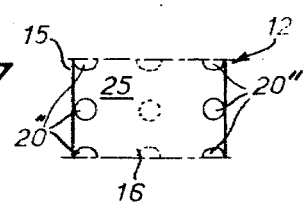
FIG. 7 is a view similar to that of FIG. 6 for yet another modified embodiment of bearing bosses.

In the embodiment illustrated in FIGS. 6 and 7, on the contrary, the bearing bosses are individually formed as discrete members at the axial extremities of the bore 16.

Accordingly the volume of the cavity defined axially between these bearing bosses, designated by general reference numeral 25 in FIGS. 6 and 7, is correspondingly augmented.

Preferably, as depicted, the substantially rigid bearing bosses 20' are again arranged in pairs at the axial extremities of a given generatrix of the bore 16.

In the modified embodiment of FIG. 6 these discrete bearing bosses 20' are of diamond-shaped contour.

In the modified embodiment of FIG. 7 the substantially rigid bearing 20" are of circular contour, their leading edges are then the outwardly directly portion of their contours which are nonetheless deemed to be inclined with respect to the axis of the thrust bearing.

It goes without saying that the present invention is not intended to be limited to the various described and illustrated embodiments but encompasses all modifications, alternatives, and expedients of the various features.

In particular, the leading edges of the rigid bearing bosses are not necessarily V-shaped or semicircular as described and illustrated. It suffices that the leading edge be inclined with respect to the axis of the release bearing.

Furthermore, it is not essential that the bearing bosses define a cylindrical surface along which they bear on the guide member. As shown in dotted lines in FIG. 4 the bearing surfaces may be of convex or inwardly protruding cross-section and thereby in line contact with the surface of the guide member or even point contact if the convex or inwardly protruding cross-section is present in different planes. To the left in FIG. 4 the dotted lines show bosses of triangular profile and, to the right, rounded or semi-circular profile.

Last of all, in case of discrete substantially rigid bearing bosses one or more intermediate bearing bosses of the same type may be provided between the bearing bosses on the same generatrix at the extremities of the bore, as shown schematically in dotted lines in FIGS. 6 and 7.

What is claimed is:

1. A clutch release bearing having an axial bore adapted to be slidably received on a fixed guide member, inwardly protruding bearing bosses on said bore for bearing radially on the guide member, said bearing bosses defining passages circumferentially between one another, said bearing bosses being substantially rigid and having outwardly directed leading and trailing edges each having means for deflecting dirt or grime which may be present on the guide member into said passages, said means including each of said trailing and leading edges being at least in part generally inclined generally transverse with respect to the axis of said release bearing.

2. The release bearing according to claim 1, said bearing bosses being arranged in pairs at axial extremities of generatrices along the axial bore through said release bearing, wherein each said pair of bearing bosses along a said generatrix forms axial ends of an axial rib interconnecting uninterruptedly and in one piece said pair of bearing bosses.

3. The release bearing according to claim 2, further comprising a cavity or recess in the axial bore of said release bearing for collecting dirt or grime including an array of grooves delimited between circumferentially adjacent said ribs for communicating with said passages.

4. The release bearing according to claim 3, wherein said grooves formed between circumferentially adjacent said ribs are of rectangular transverse cross-section, the bottoms of said grooves being defined entirely by the wall of the axial bore through said release bearing.

5. The release bearing according to claim 3, wherein said grooves between two circumferentially adjacent ribs are of semicircular transverse cross-section.

6. The release bearing according to claim 1, said bearing bosses being arranged in pairs at axial extremities of generatrices of the axial bore through said release bearing, further comprising at least one additional bearing boss intermediate the bosses of each said pairs of bearing bosses.

7. The release bearing according to claim 1, said bearing bosses being arranged in pairs at axial extremities of generatrices of the axial bore through said release bearing, and wherein said bearing bosses are of diamond-shaped contour.

8. The release bearing according to claim 1, said bearing bosses being arranged in pairs at axial extremities of generatrices of the axial bore through said release bearing, and wherein said bearing bosses are of circular contour.

9. The release bearing according to claim 2, wherein the transverse cross-section of said bearing bosses is inwardly convex, and said inwardly convex bearing bosses are of triangular profile.

* * * * *